United States Patent
Ungerechts et al.

(10) Patent No.: US 8,622,187 B2
(45) Date of Patent: Jan. 7, 2014

(54) CONVEYING DEVICE FOR POWDERY AND/OR GRANULATED MATERIAL

(75) Inventors: Herbert Ungerechts, Kerken (DE); Hans-Joerg Frank, Toenisvorst (DE); Markus Hagedorn, Muelheim/Ruhr (DE)

(73) Assignee: Bayer MaterialScience AG, Leverkusen (DE)

( * ) Notice: Subject to any disclaimer, the term of this patent is extended or adjusted under 35 U.S.C. 154(b) by 14 days.

(21) Appl. No.: 13/428,590

(22) Filed: Mar. 23, 2012

(65) Prior Publication Data

US 2012/0247915 A1 Oct. 4, 2012

(30) Foreign Application Priority Data

Mar. 30, 2011 (EP) .................................... 11160510

(51) Int. Cl.
*B65G 47/04* (2006.01)
(52) U.S. Cl.
USPC .................................. 193/15; 193/16; 198/541
(58) Field of Classification Search
USPC .......... 193/2 R, 3, 4, 15, 16, 20, 28; 198/532, 198/541, 562
See application file for complete search history.

(56) References Cited

U.S. PATENT DOCUMENTS

| | | | | | |
|---|---|---|---|---|---|
| 4,125,195 | A | * | 11/1978 | Sasadi | 193/16 |
| 4,339,024 | A | * | 7/1982 | Wollin | 193/34 |
| 5,335,917 | A | * | 8/1994 | Kuna | 273/445 |
| 5,881,780 | A | | 3/1999 | Matye et al. | |
| 6,120,211 | A | * | 9/2000 | Raike | 193/23 |
| 6,971,495 | B2 | * | 12/2005 | Hedrick et al. | 193/2 R |
| 2005/0034957 | A1 | * | 2/2005 | Bonita | 193/2 R |

FOREIGN PATENT DOCUMENTS

| | | |
|---|---|---|
| DE | 4207333 A1 | 3/1993 |
| DE | 195 272 40 C1 | 9/1996 |
| DE | 29917419 U1 | 3/2000 |
| DE | 202005016035 U1 | 1/2006 |
| EP | 1550833 A2 | 7/2005 |

\* cited by examiner

*Primary Examiner* — James R Bidwell
(74) *Attorney, Agent, or Firm* — Novak Druce Connolly Bove + Quigg LLP

(57) ABSTRACT

A conveying device for free-flowing fine-particle solids (bulk material), in particular for powdery and/or granular (mixed) material, especially plastic granulate, includes a vertically arranged and flexibly mountable pipe for the conveyance of, preferably, polymer granulates, for example in a plant for the filling of polymer granulates. The transport pipe may be included on a mobile work platform.

14 Claims, 4 Drawing Sheets

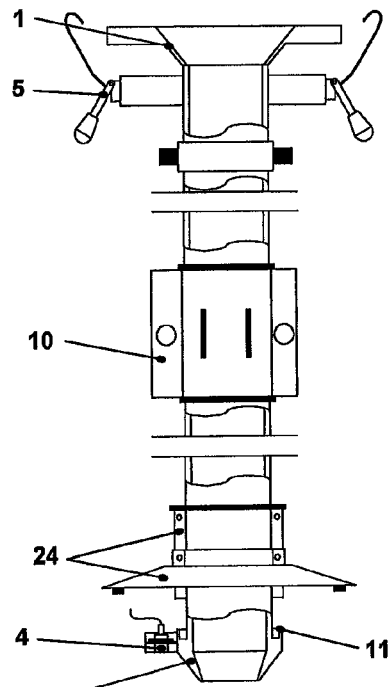
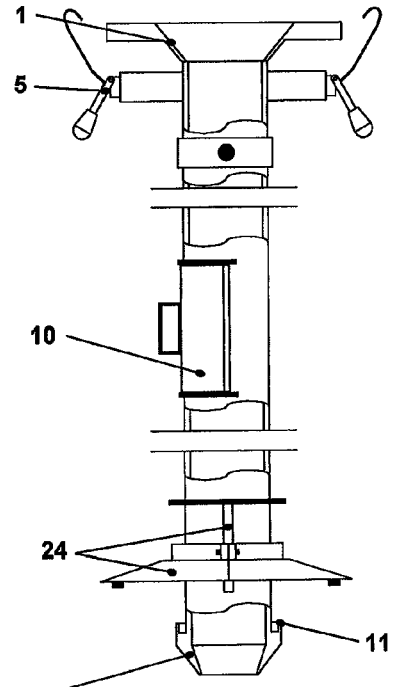
Fig. 1
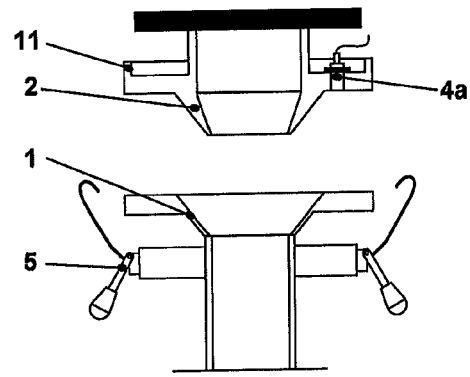
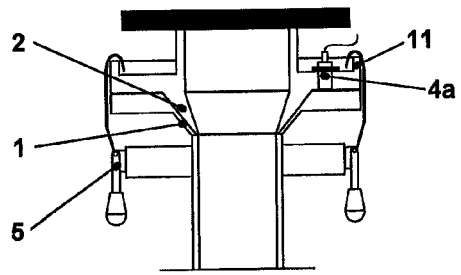
Fig. 2a
Fig. 2b
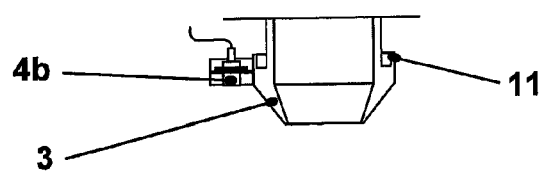
Fig. 3

CONVEYING DEVICE FOR POWDERY AND/OR GRANULATED MATERIAL

BACKGROUND OF THE INVENTION

1. Priority

Priority is claimed to European Patent Application No. 11 160 510.1, filed Mar. 30, 2011, the disclosure of which is incorporated herein by reference in its entirety.

2. Field of the Invention

The field of the present invention is conveying devices for free-flowing fine-particle solids (bulk material), in particular for powdery and/or granular (mixed) material, especially plastic granulate, such as are used in a filling plant for polymer granulates.

3. Background

The gravelly product which accumulates in the reactor in the manufacture of thermoplastic plastics is plasticized in an extruder and shaped into single strands, which are cut into granulates by means of a blade which rotates in the granulating tool. In a further step, this product can be provided with further components by compounding.

By compounding is meant, in polymer processing, the manufacture of finished plastic moulding material, the compound, from the plastic raw materials, with the addition of fillers and reinforcing agents, softeners, adhesion-promoting agents, lubricants, stabilizers, etc. The compounding predominantly takes place in extruders and comprises the process operations conveyance, melting, dispersion, mixing, degassing and pressurization.

In granulation, the melt is then pressed through the openings in a die base, so that after this, in the case of strand granulation, melt strands are initially produced, which then in the granulation produce cylindrical granules, or else, in the case of head granulation, are cut directly at the outlet on the die base and then produce lenticular or spherical granules. Granulation can also take place, for instance, in a liquid flow, which cools the granules and largely prevents agglomeration. The granulate is subsequently dried and sifted.

Subsequent to the post-manufacture or post-compounding granulation, the product is generally conveyed pneumatically to a silo or bunker. After this, the bulk material is removed from the silo or bunker and filled into containers or silo vehicles, or the bulk material is bagged into big bags, octabins or sacks. In each of these steps, dusts/deposits can be formed, for example, by abrasion, which dusts/deposits, in addition to the bulk material itself, can then cause contamination when the bulk material is changed.

Typical bulk materials are, for example, construction materials, such as topsoil, sand, gravel, ballast, cement, other mineral products, such as ore, road salt, and foods, such as grain, sugar, table salt, coffee, flour, as well as powdery products such as pigments, fillers, granules, pellets, etc.

At the same time, the demand for flexibility is constantly increasing, so that in a filling plant equipment can be exchanged according to needs. For instance, in the case of a bulk material, there may be a demand for a sifter (dedusting unit) to remove fine particles, whilst for other bulk materials only a conveying pipe is necessary. Moreover, the investment costs are not inconsiderable, so that a flexible solution for the use of, for instance, a conveying pipe at various locations in a plant is enabled.

DE 195 272 40 C1 describes a conveying device, wherein a portion of the conveying line between two rigidly spaced counter bearings is arranged such that it is exchangeable and the exchangeable conveying line portion is configured to be telescopic under the action of a tension spring and the ends of the telescopic arrangement are supported against the counter bearings. The design-conditioned, appropriate cleaning effort for the avoidance of contamination as soon as another solid is conveyed, particularly in the pipe flange region and in the pipe inner contour, is disadvantageous.

The demand for easy washability of conveying devices prior to the conveyance of another bulk material type is made, however, with increasing frequency.

SUMMARY OF THE INVENTION

The object of the present invention is therefore to eliminate the drawbacks of the prior art.

Since the prior art allows no adequate solution to this problem, the object of the present invention is to provide a conveying device which allows a seal-tight connection between bulk material removal devices and bulk material filling devices, which are arranged vertically one above the other on stages of different height. This bulk material conveying pipe should, in particular, be usable at different positions within a filling building and, for this purpose, should be exchangeable and easily, yet securely mountable.

BRIEF DESCRIPTION OF THE DRAWINGS

In the drawings, wherein like reference numerals refer to similar components:

FIG. 1 shows an overall view of the bulk material conveying pipe.

FIGS. 2a/2b show a detailed view of the pipe inlet flange (1), with the outlet flange (2) situated spatially above it, of a silo from which granulate is to be removed. In FIG. 2a, the bulk material conveying pipe is not connected to the silo outlet flange; in FIG. 2b, the bulk material conveying pipe is connected to the silo outlet flange.

FIG. 3 shows the pipe outlet flange (3), which can be connected to the below-situated filling plants.

DETAILED DESCRIPTION OF THE PREFERRED EMBODIMENTS

Figure 4:
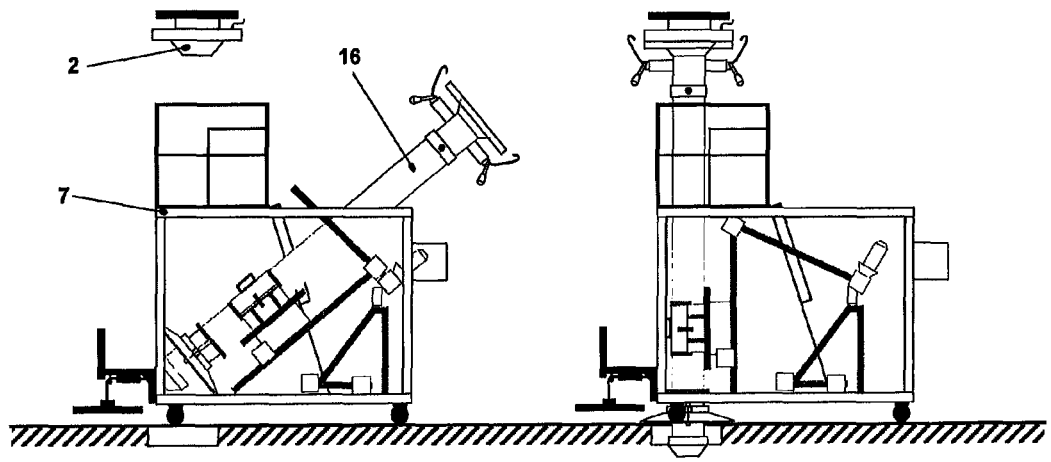
FIG. 4 shows the mobile work platform for handling of the bulk material conveying pipe with two pipe positions.

A conveying device which meets the defined object includes a conveying pipe and has the following features:
 a) a pipe inlet flange on the upper conveying pipe end and a pipe outlet flange on the lower conveying pipe end;
 b) rotationally symmetric counter flanges to the conveying pipe flanges;
 c) rapid-action clamping devices as pipe fastenings having the rotationally symmetric counter flanges and receiving collars for ensuring a quick and seal-tight connection of the flanges one to another;
 d) where necessary, sensors on one or both flanges of the conveying pipe, by means of which the docking of a pipe end to a docking device or to a counter flange can be reliably detected by a so-called initiator query;

e) where necessary, arrangement of the pipe on a mobile work platform for transport of the pipe to different filling locations on the stage, the mobile work platform containing lifting, transporting and pivoting device for positioning of the pipe at different docking devices on a stage.

The defined object has been by the provision of a bulk material conveying device, which, owing to the wide-ranging fields of application, (as far as possible) contain no dead spaces or joints of any kind (e.g. Seamless fitting of flange on the side which is in contact with the product) in which solid remnants could remain after filling operations and could subsequently contaminate filled bulk material batches. The bulk material conveying device can be (at least) temporarily combined with additional devices which are used for specific applications, such as, for example, the lifting or the floor covering device for the disassembling/assembling of the bulk material conveying pipe or the covering of the floor openings in order to satisfy the diverse requirements for different applications.

The pipe inlet flange (1) and the pipe outlet flange (3) are preferably respectively configured such that they allow, at normal pressure, a dust-tight and water-tight connection to the respective counter flanges of corresponding containers, pipeline ends or other docking devices, the flange connections preferably being free from joints or dead spaces of any kind. The contamination of granulate batches with foreign granules from the filling of preceding granulates can thereby be largely avoided. Additional sealing materials can be used for the flanges, but are not absolutely necessary. Suitable materials for such flanges, as well as for the pipe, are plastic, metal or steel; special steel is preferable. The pipe length is preferably matched to the height of the stages within the building or to the distances apart of the apparatuses to be connected. As a centering aid, and thus for easier assembly, the flanges and counter flanges are preferably conical in design. This cone allows a rapid centering of the flanges on the counter flange and therefore also allows a seal-tight connection by the contact surface In certain use circumstances, the flanges of the bulk material conveying pipe can in a preferred embodiment additionally contain sensors, such as the initiator (4b) shown by way of example in FIG. 3 or the initiator (4a in FIG. 2a) alternatively in the counter flange (2 in FIG. 2a/b), which sensors indicate the position of the flange of a docking device by way of a so-called initiator query and thus automatically reliably signal a correct docking operation. Such initiators are commercially available instruments and are marketed by the company Pepperl and Fuchs, for instance, under specification NCB15-30GM40-N0-V1.

The bulk material conveying pipe according to the invention is provided, for the fastening of the flange connections one to another, at least at the pipe inlet flange, where necessary also at both pipe ends, with pipe-fastening devices, which fix the bulk material conveying pipe in its working position and which ensure a sufficiently high mutual contact pressure of the flange connections. Such pipe-fastening devices can be, for example, rapid-action clamping devices (5), as represented by way of example in FIGS. 1 and 2 at the pipe inlet flange (1). Such rapid-action clamping devices are quick and flexible to handle and are therefore advantageous for the bulk material conveying pipe according to the invention, which, moreover, should also be movable. The rapid-action clamping device is hooked onto a counter flange having a rotationally symmetric receiving collar (11), whereby the rapid-action clamping devices can be fastened from all directions by simple application of the hook and shifting of the lever. This receiving collar (11) is possessed by the pipe outlet flange (3), as well as by the outlet flange (2) of the silo. Rapid-action clamping devices are commercially available instruments and are marketed, for instance, by the company Destaco under specification 351-R.

A rapid-action clamping device as used herein is a clamping device which can be clamped or declamped rapidly and easily and usually without tools by hand.

Usually, rapid-action clamping devices use an eccentric tappet which is operated over a lever. During clamping operation, the eccentric tappet is displaced slightly over the pressure point and mechanically engaged. This leads to a self-locking of the clamping device and the rapid-action clamping device cannot open of its own.

Generally the bulk material conveying pipe according to the invention, due to its dimensions and its intrinsic weight, cannot readily be manually handled, particularly not during the docking maneuvers, which call for high precision. In order to facilitate this handling, the bulk material conveying pipe, in a preferred embodiment, is brought into the desired working position with the aid of a mobile work platform, as represented schematically, by way of example, in FIG. 4.

Figure 5:
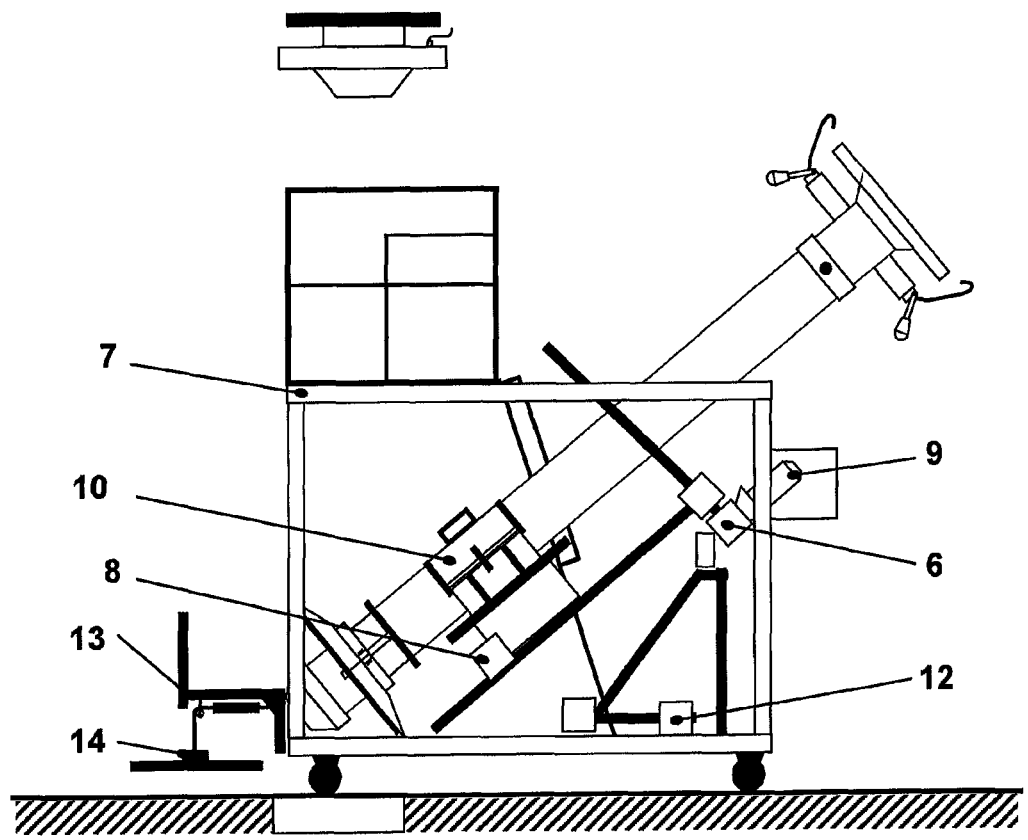
FIG. 5 shows the mobile work platform for handling of the bulk material conveying pipe in detail.
Figure 9:
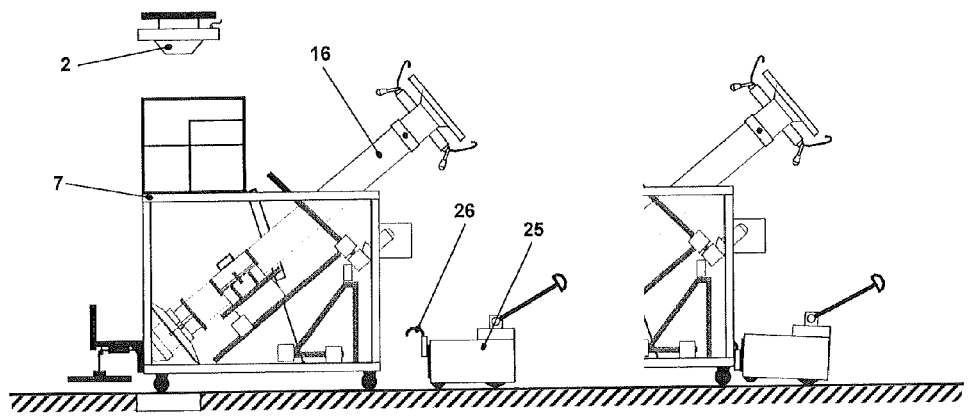
FIG. 9 shows the use of a small tractor (mover) on the mobile work platform.

This work platform, which can have a plurality of working planes, is more accurately described, by way of example, in FIG. 5:

The work platform according to the invention is suitable for removing the bulk material conveying pipe from a vertical position (for example a wall bracket or some other perpendicularly arranged rack), positioning it, with a suitable pivoting device (6) and transporting device (12), close to the work platform (7) and, in combination with a suitable lifting device (8), bringing it into the desired working position. Since this work platform can be transported, the bulk material conveying pipe can thereby be mounted very flexibly at different filling position. In a preferred embodiment, the lifting, transporting and pivoting devices can be mechanically supported, for instance, by electric drives (9). Similarly the entire work platform can preferably be moved by electric, where necessary movable drives. Movable drives, i.e. drives which are independently transmovable and can be decoupled from the conveyed material, have the advantage that they can be used for different transport functions. This so-called small tractor or mover (25) can be positively and non-positively connected to the frame of the work platform by means of a lifting gear including two adaptation of booms (26). The operator can thus accelerate, brake and steer the work platform using a driven rotatable ground wheel of the mover, as represented in FIG. 9. Drives which are fixedly connected to the work platform can also however be used.

In order to aid the positioning of the work platform beneath a silo, in a preferred embodiment three positioning lasers, which cast two or more, preferably three, light spots onto the floor, are used. When correctly positioned, the light spots are located in an accurately defined region, for instance on the round floor cover rim.

In a preferred embodiment, the transporting, pivoting and lifting devices of the work platform here engage in pipe-receiving devices (10), as represented in FIG. 1, which are directly attached to the bulk material conveying pipe in order to be able to handle it securely.

For further work safety, in another preferred embodiment, a separate lifting-pivoting device (13), for instance with electrical lifting magnet (14), is used to open the floor cover (if present) for the protection of the floor opening. The work operation for the removal of the floor cover or the insertion of the floor cover is performed with a fall protection. The fall protection consists of a pivotable guard rail, which is electromechanically secured against opening and is released by means of an initiator only when there is no risk of falling. To this end, an initiator identifies the floor opening by means of light scanning. The initiators are commercially available instruments.

Figure 7:
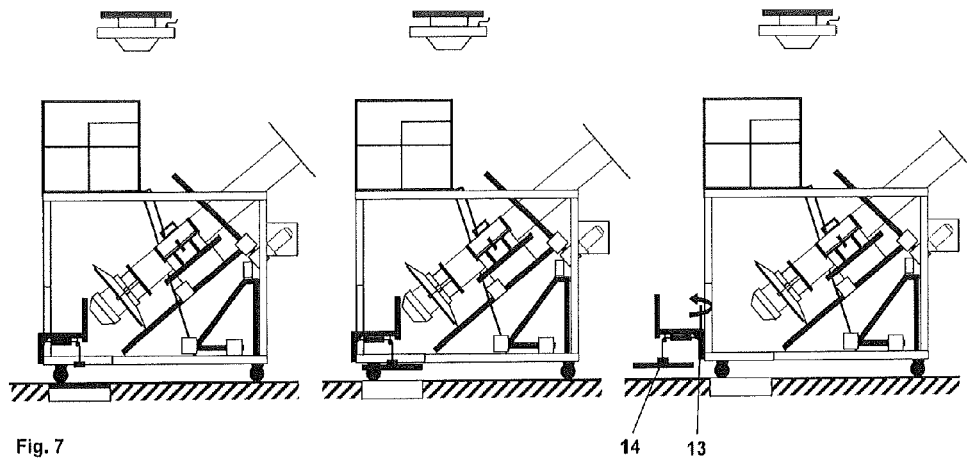
FIG. 7 shows the working method of a floor cover lifting/pivoting device on the mobile work platform.

Thus a cover lifting device (13 with 14) is preferably fixedly connected to the mobile work platform for the bulk material conveying pipe, by means of which covers present in floor openings can be raised from stages within the building and set aside, where necessary, in order that the bulk material conveying pipe can be run through the freed floor opening. The cover lifting device (13 with 14) is here integrated in the mobile work platform such that the lifting mechanism operates directly below the pipe outlet flange. The design and working method of such a cover lifting device is illustrated by FIG. 7.

This cover lifting device (13 with 14) can in principle also be used as a separate, where necessary mobile device.

Figure 8:
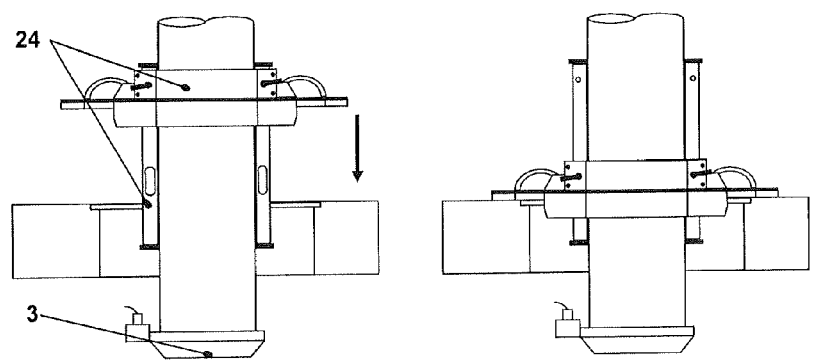
FIG. 8 shows the floor opening cover on the bulk material conveying pipe.

In a further embodiment, the bulk material conveying pipe (16) is fixedly connected to a floor opening cover (24), which is intended to prevent persons or objects from being at risk of falling into the remaining, for example circular-segment-shaped floor opening following the introduction of the bulk material conveying pipe through the, for example, circular floor opening in the stage of the building. Moreover, the bulk material conveying pipe is prevented from falling through the floor opening if the coupling to the silo outlet flange (2) were not to be carried out or were to be carried out incorrectly. FIG. 1 shows such a floor opening cover (24) in schematic representation; in FIG. 8, it is represented graphically (24).

Figure 6:
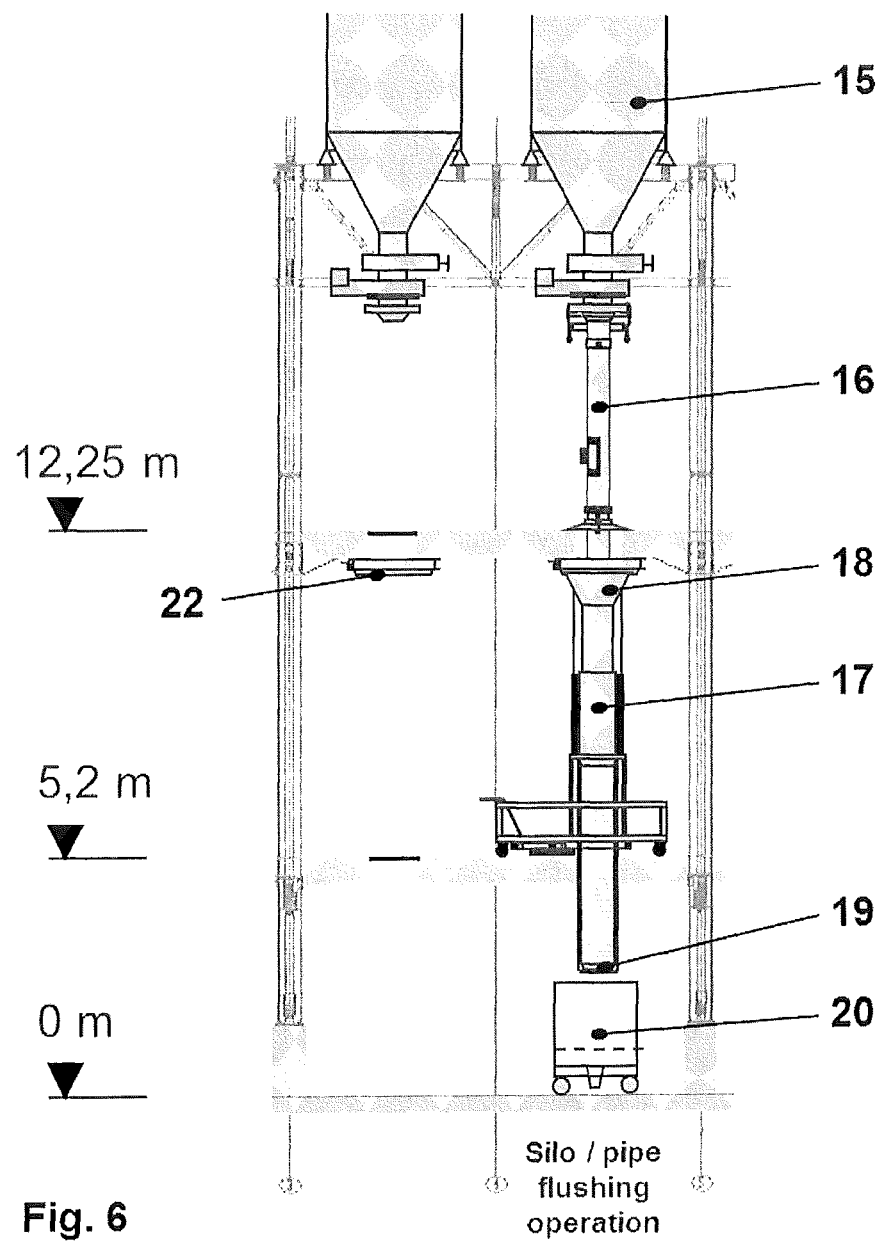
FIG. 6 shows the silo flushing operation in connection with the use of the bulk material conveying pipe and of a telescopic flushing pipe.

A typical work operation which is effectively supported by the bulk material conveying pipe according to the invention is described below, based on the example of silo flushing, as sketched, by way of example, in FIG. 6.

In this case, a silo (15) which has been emptied yet which has previously conducted bulk material is connected to a rigid bulk material conveying pipe (16) by rapid-action clamping devices (5) and the pipe outlet flange (3) thereof ends in a funnel (18) of a telescopic flushing pipe (17). The telescopic flushing pipe is positioned by the docking of the funnel (18) onto a ceiling centering ring (22) and sealed in the direction of the ceiling. The outlet flange (19) of the telescopic flushing pipe (17) extends into a collecting filter cart (20) for flushing solutions. Via the silo (15), the flushing process can now begin, preferably with pure water, which is collected as flushing solution in the bottommost filter cart (20). In this way, over a distance of three stages within the building, a pipe connection which is stable but which is nevertheless quick and flexible to fit can be installed, which pipe connection can provide the desired seal-tightness and lead away the flushing water, securely and without leaks, into a filter cart (20) on the bottommost stage of the building. From here, the flushing water flows over a surface into a waste water duct with granulate separator.

Thus, a conveying device is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A conveying device, comprising:
   a conveying pipe, and
   a pipe inlet flange on an upper conveying pipe end of the conveying pipe,
   a pipe outlet flange on a lower conveying pipe end of the conveying pipe,
   a lower rotationally symmetric counter flange coupled to the pipe outlet flange, and
   rapid-action clamping devices coupled to the pipe inlet flange for use as pipe fastenings, the rapid-action clamping devices being configured to connect to an upper rotationally symmetric counter flange and an upper receiving collar, wherein the rapid-action clamping devices are configured to provide a quick and seal-tight connection of the pipe inlet flange to the upper rotationally symmetric counter flange.

2. The conveying device according to claim 1, wherein the conveying device is constructed to minimize dead space.

3. The conveying device according to claim 1, wherein, on one or both rotationally symmetric counter flanges, sensors are included by which the docking of a pipe end to a docking device or to a counter flange can be reliably detected by virtue of an initiator query.

4. The conveying device according to claim 1, wherein the conveying pipe is disposed on a mobile work platform for transport of the conveying pipe to different filling sites on a stage, the mobile work platform containing lifting, transporting and pivoting devices for positioning of the conveying pipe at different docking devices on the stage.

5. The conveying device according to claim 4, wherein the lifting, transporting and pivoting devices are supported by electric drives.

6. The conveying device according to claim 4, wherein the mobile work platform is movable by electric drives.

7. The conveying device according to claim 1, further comprising
   a separate lifting-pivoting device coupled to the conveying pipe and adapted for raising of a floor cover; and
   a pivoting guard rail coupled to the conveying pipe and adapted to protect a floor opening.

8. The conveying device according to claim 7, wherein the pivoting guard rail is locked by electromechanical means and is released only by means of a light scanner adapted to identify the floor opening.

9. The conveying device according to claim 4, wherein a positioning operation of the mobile work platform is supported by a common position of light spots of positioning lasers supports.

10. The conveying device according to claim 9, further comprising at least two positioning lasers adapted to create light spots on a floor, such that a common position of the light spots serves as indicia of appropriate operational positioning of the mobile work platform.

11. The conveying device according to claim 1, wherein the conveying pipe is configured to fixedly connect to a floor opening cover.

12. The conveying device according to claim 1, wherein the upper and lower rotationally symmetric counter flanges are configured to connect to respective counter flanges of corresponding containers, pipeline ends, or other docking devices.

13. The conveying device according to claim 1, wherein each rapid-action clamping device comprises hook and lever elements.

14. The conveying device according to claim 4, wherein the mobile work platform is movable by movable drives.

* * * * *